United States Patent
Kurashima et al.

(10) Patent No.: US 7,307,625 B2
(45) Date of Patent: Dec. 11, 2007

(54) TOUCH PANEL, AND INPUT DEVICE AND ELECTRONIC APPARATUS EACH EQUIPPED WITH THE TOUCH PANEL

(75) Inventors: Shigemi Kurashima, Shinagawa (JP); Shinichiro Akieda, Shinagawa (JP); Hiroto Inoue, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 613 days.

(21) Appl. No.: 10/765,878

(22) Filed: Jan. 29, 2004

(65) Prior Publication Data

US 2004/0183788 A1   Sep. 23, 2004

(30) Foreign Application Priority Data

Jan. 30, 2003   (JP) .............................. 2003-021269

(51) Int. Cl.
    *G09G 5/00*   (2006.01)
(52) U.S. Cl. .................... 345/173; 345/156; 178/18.05
(58) Field of Classification Search ........ 345/156–160, 345/162, 164, 165–166, 169, 173, 174–177, 345/87–88; 178/18.01, 18.06, 18.09; 343/726–730, 343/700
    See application file for complete search history.

(56) References Cited

U.S. PATENT DOCUMENTS 6,636,181 B2 *   10/2003   Asano et al. ................ 343/702

FOREIGN PATENT DOCUMENTS

| JP | 5-189191    | 7/1993 |
|----|-------------|--------|
| JP | 2002-215330 | 8/2002 |

* cited by examiner

*Primary Examiner*—Richard Hjerpe
*Assistant Examiner*—Mansour M. Said
(74) *Attorney, Agent, or Firm*—Staas & Halsey LLP

(57) ABSTRACT

A touch panel includes: a first layer and a second layer that are arranged to face each other, with a predetermined gap being formed between the first layer and the second layer; a first resistance film that is formed on a surface of the first layer, the surface facing the second layer; a second resistance film that is formed on a surface of the second layer, the surface facing the first layer; and a power supply unit that is provided on the first resistance film. In this touch panel, the first resistance film and the second resistance film form an antenna.

21 Claims, 8 Drawing Sheets

Fig. 7A  Fig. 7B
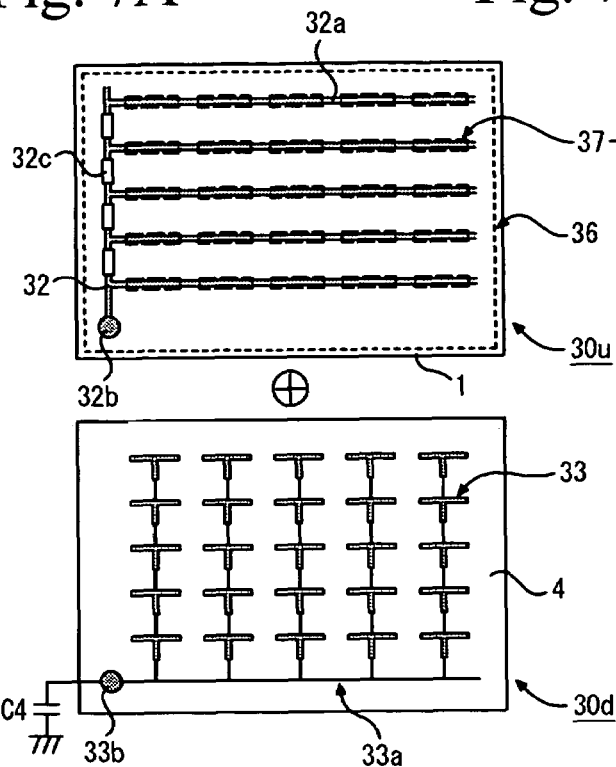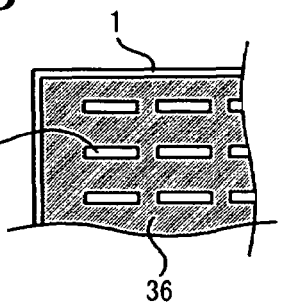
Fig. 7C
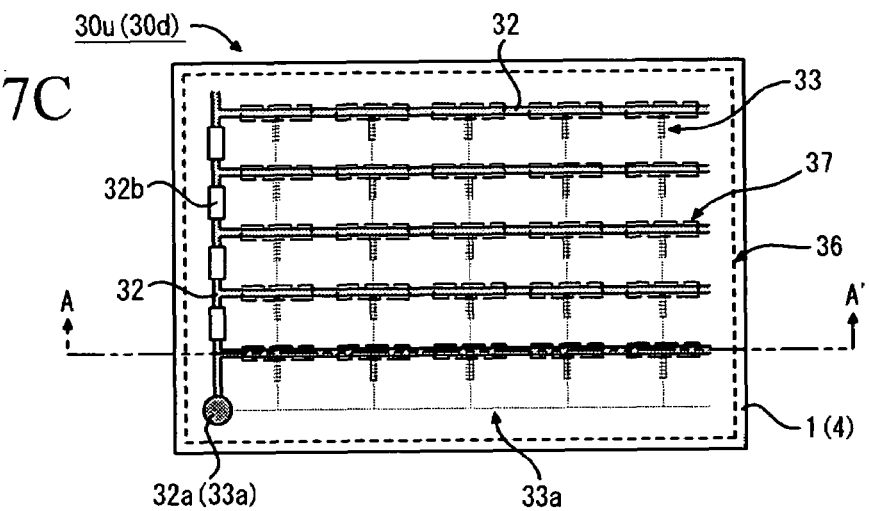
Fig. 7D
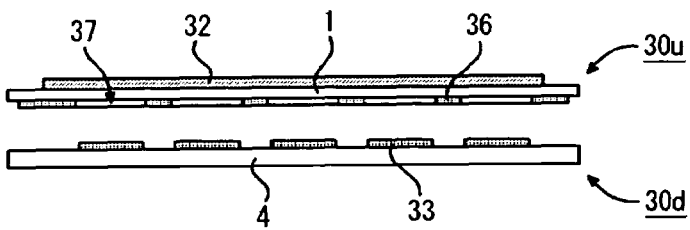

TOUCH PANEL, AND INPUT DEVICE AND ELECTRONIC APPARATUS EACH EQUIPPED WITH THE TOUCH PANEL

BACKGROUND OF THE INVENTION

1. Field of the Invention

The present invention generally relates to a touch panel having resistance films facing each other, and an input device and an electronic apparatus each equipped with the touch panel, and more particularly, to a touch panel having an antenna for short-distance wireless data communication, and an input device and an electronic apparatus each equipped with the touch panel.

2. Description of the Related Art

In recent years, short-distance wireless data communication techniques such as wireless LAN (local area network) and Bluetooth (trade name) have been developed. These techniques are greatly expected to provide interfaces for connecting mobile devices to one another, or connecting mobile devices to stationary electronic apparatuses.

However, the mobile devices such as portable telephones and PDAs (Personal Digital Assistants) have become too small, as the technology has dramatically advanced. Also, there is an increasing demand in the market for smaller mobile devices with higher performance. In this trend, it is difficult to secure a large enough space for a high gain antenna of wireless data communication.

To solve the above problem, Japanese Unexamined Patent Publication No. 5-189191 discloses a structure in which an antenna is mounted on a display device such as a liquid crystal display.

Referring to FIGS. 1A and 1B, a structure having a flat antenna 110 provided on the back surface of a flat display device 100. FIG. 1A is a perspective view illustrating the front surface of the flat display device 100. FIG. 1B is a perspective view illustrating the back surface (the side with the antenna) of the flat display device 100. As shown in FIGS. 1A and 1B, the flat display device 100 includes a LCD (Liquid Crystal Display) 101, a transmit/receive (TX/RX) unit 102, a battery 103, and the flat antenna 110 that is a bent lead-wire antenna provided on the opposite side to the other three components. Accordingly, the space for accommodating antenna can be made small by this conventional technique.

In a case where the display unit also serves as an input device of touch panel type, such as the display unit of a PDA, an antenna can be mounted in the same manner as the above. Japanese Unexamined Patent Publication No. 2002-215330, for example, discloses such a structure.

Referring now to FIG. 2, a structure having an antenna wire 210 provided on a touch panel device 200 will be described. FIG. 2 only shows the layer on which the antennal wire 210 is provided in the touch panel device 200 having a multi-layer structure. As shown in FIG. 2, the touch panel device 200 has the antenna wire 210 that is brought into contact with electrodes on an upper layer (or a lower layer) by a user pressing the touch panel. This antenna wire 210 is formed along the outer periphery of a substrate 201 on which electrically connected transparent electrodes (made of ITO; Indium Tin Oxide) 202 and 203 are provided. Accordingly, the space for accommodating another antenna can also be made small by this conventional technique.

With either of the above conventional techniques, however, there is a problem that the size increase due to the addition of an antenna cannot be avoided. With the above conventional structures, there is another problem that, as electromagnetic wave stays within the device due to the antenna formed on the back surface of the device, only a reduced effect can be achieved. There is yet another problem that sufficient gain cannot be obtained with a wire-type antenna.

SUMMARY OF THE INVENTION

It is therefore an object of the present invention to provide a touch panel, and an input device and an electronic apparatus each equipped with the touch panel in which the above disadvantage is eliminated.

A more specific object of the present invention is to provide a small-sized touch panel that does not cause attenuation of generated electromagnetic wave and can achieve sufficient gain, and an input device and an electronic apparatus each equipped with the touch panel.

The above objects of the present invention are achieved by a touch panel comprising: a first layer and a second layer that are arranged to face each other, with a predetermined gap being formed between the first layer and the second layer; a first resistance film that is formed on a surface of the first layer; a second resistance film that is formed on a surface of the second layer; and a power supply unit that is provided on the first resistance film, wherein the first resistance film and the second resistance film that are originally used for sensing a touch form an antenna.

The above objects of the present invention are also achieved by a touch panel comprising: a first layer and a second layer that are arranged to face each other, with a predetermined gap being formed between the first layer and the second layer; and a first resistance film and a second resistance film that are formed on two parallel surfaces of the first layer and the second layer, and are patterned so as to resonate at a predetermined frequency, the first resistance film and a second resistance film that are originally used to sense a touch form an antenna.

The above objects of the present invention are also achieved by a touch panel comprising: a first layer and a second layer that are arranged to face each other, with a predetermined gap being formed between the first layer and the second layer; and a Yagi-Uda antenna that is formed on the first layer.

The above objects of the present invention are also achieved by an input device comprising: a touch panel; a touch panel controller that controls the touch panel; and a transmit/receive unit that transmits and receives data through an antenna, the touch panel including: a first layer and a second layer that are arranged to face each other, with a predetermined gap being formed between the first layer and the second layer; a first resistance film that is formed on a surface of the first layer; a second resistance film that is formed on a surface of the second layer; and a power supply unit that is provided on the first resistance film, the first resistance film and the second resistance film that are originally used to sense a touch form the antenna.

The above objects of the present invention are also achieved by an input device comprising: a touch panel; a touch panel controller that controls the touch panel; and a transmit/receive unit that transmits and receives data through an antenna, the touch panel including: a first layer and a second layer that are arranged to face each other, with a predetermined gap being formed between the first layer and the second layer; a first resistance film that is formed on a surface of the first layer; a second resistance film that is formed on a surface of the second layer; and a power supply unit that is provided on the first resistance film, the first resistance film and the second resistance film forming a plurality of antennas that resonate at predetermined different frequencies, and the transmit/receive unit performing ultra broadband wireless communication through the plurality of antennas.

The above objects of the present invention are also achieved by an electronic apparatus comprising an input device that includes: a touch panel; a touch panel controller that controls the touch panel; and a transmit/receive unit that transmits and receives data through an antenna, the touch panel including: a first layer and a second layer that are arranged to face each other, with a predetermined gap being formed between the first layer and the second layer; a first resistance film that is formed on a surface of the first layer; a second resistance film that is formed on a surface of the second layer; and a power supply unit that is provided on the first resistance film, the first resistance film and the second resistance film that are originally used to sense a touch form the antenna.

BRIEF DESCRIPTION OF THE DRAWINGS

Other objects, features and advantages of the present invention will become more apparent from the following detailed description when read in conjunction with the accompanying drawings, in which:

FIG. 7A is a top view of an upper layer and a lower layer included in a touch panel in accordance with a third embodiment of the present invention;

FIG. 7B is a partial view showing the back surface of the upper layer;

FIG. 7C is a top view of the touch panel having the upper layer and the lower layer arranged to face each other;

FIG. 7D is a section view of the touch panel, taken along the line A-A' of FIG. 7C;

DESCRIPTION OF THE PREFERRED EMBODIMENTS

The following is a description of preferred embodiments of the present invention, with reference to the accompanying drawings.

(First Embodiment)

Figure 1A:
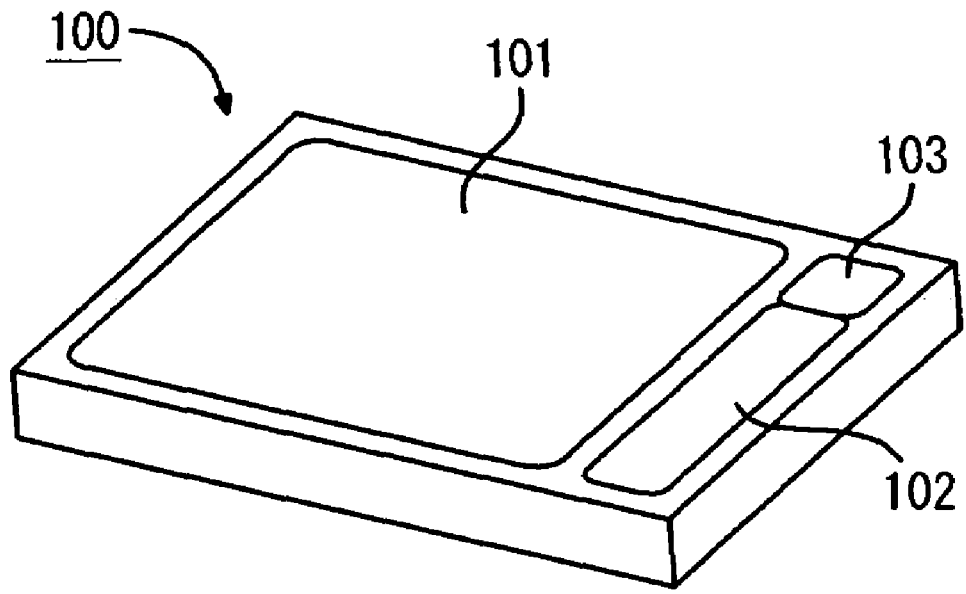
FIGS. 1A and 1B illustrate the structure of a conventional flat display device.
Figure 1B:
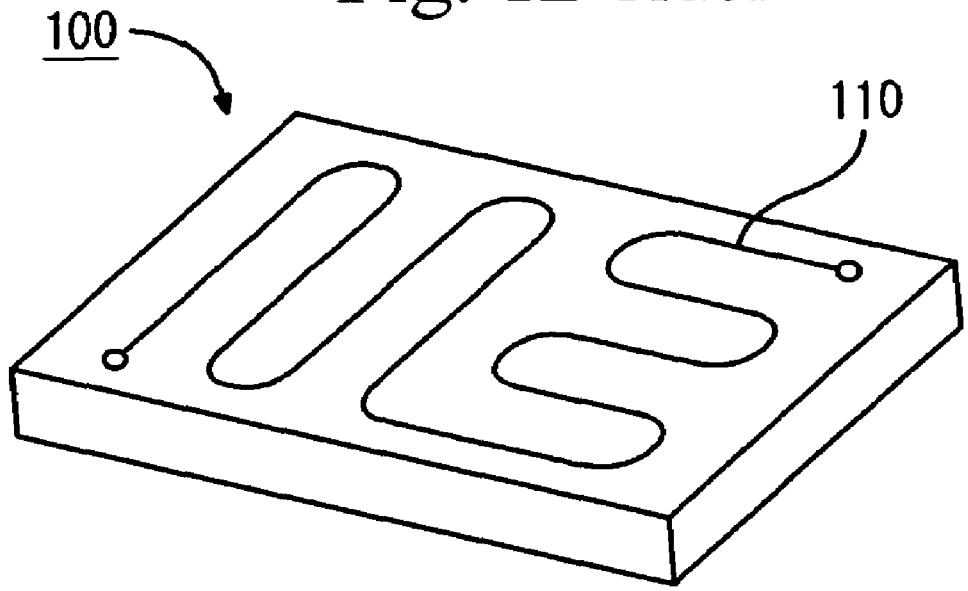
Figure 2:
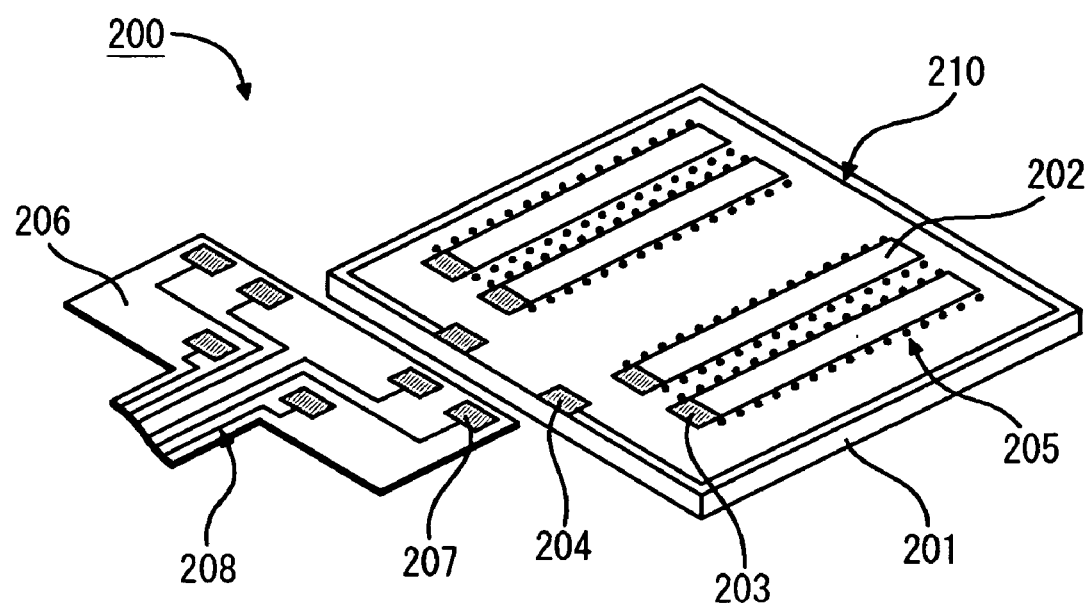
FIG. 2 illustrates the structure of a conventional touch panel device.
Figure 3A:
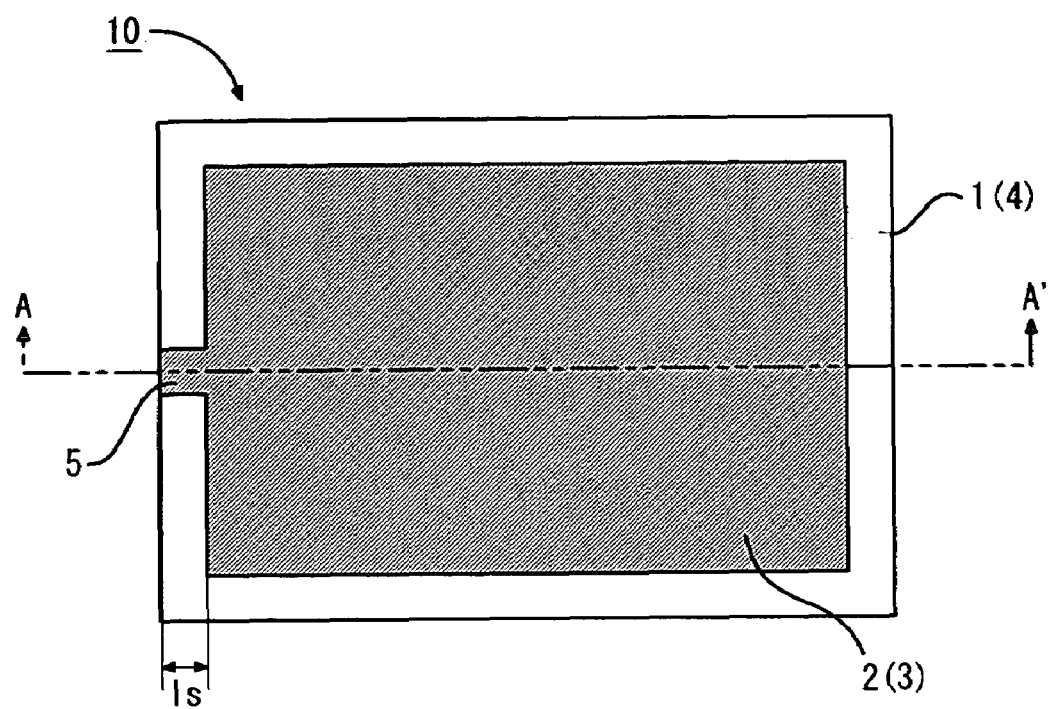
FIG. 3A is a top view of a touch panel in accordance with a first embodiment of the present invention.
Figure 3B:
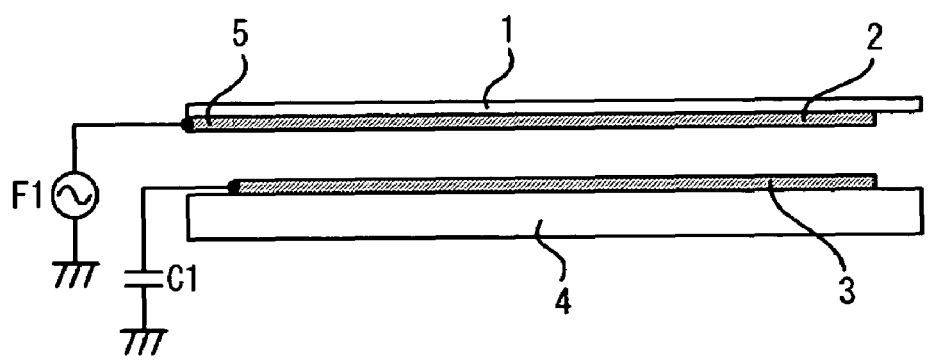
FIG. 3B is a section view of the touch panel, taken along the line A-A' of FIG. 3A.

First, a first embodiment of the present invention will be described in detail. FIGS. 3A and 3B illustrate the structure of a touch panel 10 in accordance with this embodiment. FIG. 3A is a top view of the touch panel 10, and FIG. 3B is a section view of the touch panel 10, taken along the line A-A' of FIG. 3A.

As shown in FIGS. 3A and 3B, the touch panel 10 includes two films 1 and 4 that are arranged to face each other, with a spacer (not shown) forming a predetermined gap G between the films 1 and 4. The touch panel 10 also includes transparent electrodes 2 and 3 formed on the facing surfaces of the films 1 and 4, respectively In this embodiment, the facing surfaces having the transparent electrodes 2 and 3 formed thereon are flat surfaces of the same square shape.

As shown in FIG. 3B, one of the transparent electrodes 2 and 3 (the transparent electrode 2 on the upper layer in the example shown in FIG. 3B) has a stub (a power supply unit) 5 that inputs or outputs a predetermined radiofrequency while performing impedance matching. The stub 5 not only functions as a power supply point, but also detects a potential difference caused by a user pressing the panel for input. Meanwhile, the other transparent electrode (the transparent electrode 3 in the example shown in FIG. 3B) is grounded via a capacitor Cl for maintaining the potential at a low level with respect to the radiofrequency. Accordingly, the two transparent electrodes 2 and 3 not only function as resistance films for generating a potential difference used to detect an input, but also as a microstrip flat antenna. In FIG. 3B, F1 indicates a radiofrequency oscillation source that outputs a predetermined radiofrequency.

In this structure, the films 1 and 4 are made of transparent materials such as glass (including quartz glass) and plastic resin. The films 1 and 4 may be made of the same material, or one of the films 1 and 4 may be made of glass while the other is made of plastic resin. The transparent electrodes 2 and 3 may be made of materials including ITO (Indium Tin Oxide) and NESA, for example. If non-transparent electrodes are required, carbon resistance films or organic conductive films should be employed.

The transparent electrodes 2 and 3 are formed by patterning. The patterning is performed by etching or cutting using laser beams. In case where the transparent electrodes 2 and 3 are formed by carbon resistance films or organic conductive films, screen printing such as silkscreen printing should be performed. In such a case, the length of the stub 5 (indicated by "1s" in FIG. 3A) is adjusted so that the resonant frequency of the antenna in the form of microstrips is suitably controlled.

In this manner, the two electrodes (the transparent electrodes 2 and 3) that have been used in conventional touch panels are used as an electromagnetic wave generating antenna in the form of microstrip lines. In this structure, a radiofrequency is supplied to one of the electrodes, while the potential of the other electrode is maintained at a low level (preferably at the ground potential level) with respect to the radiofrequency. Thus, a small-sized touch panel equipped with a square microstrip antenna can be achieved with a simple structure. For such a touch panel, it is not necessary to add antenna electrodes to a conventional structure, and only two electrode films are required. Also, as the antenna has a microstrip structure, sufficiently high gain can be achieved. The above structure is advantageous also in that the conventional touch panel producing process can be employed.

Referring now to the block diagram shown in FIG. 4, the functional structure of an input device 10a equipped with the touch panel 10 will be described in detail.

Figure 4:
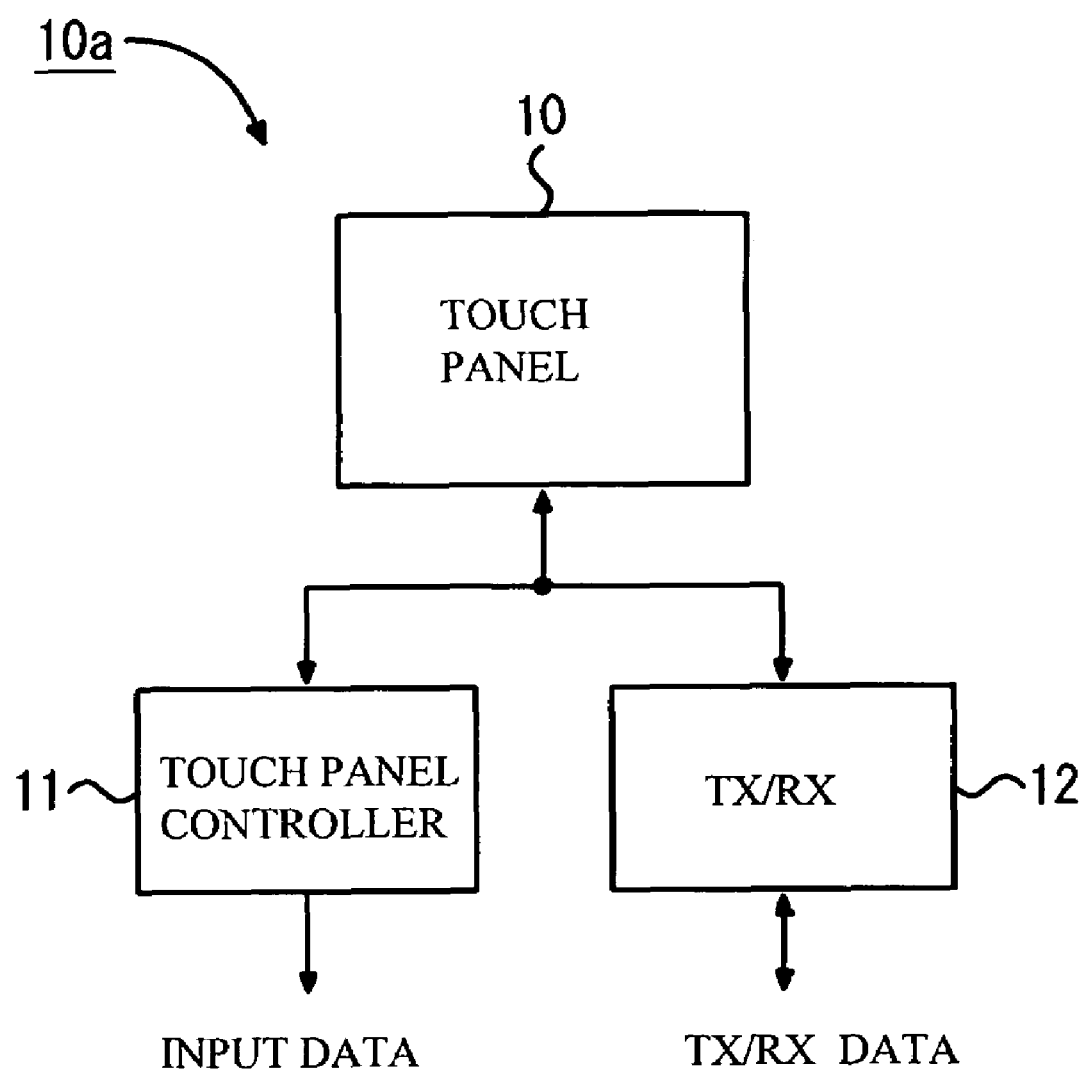
FIG. 4 is a block diagram illustrating the structure of an input device equipped with the touch panel shown in FIGS. 3A and 3B.

As shown in FIG. 4, the input device 10a in accordance with this embodiment includes the touch panel 10, and a touch panel controller 11 and a transmit/receive unit 12 that are connected to the transparent electrode 2 of the touch panel 10 via the stub 5.

In this structure, the touch panel controller 11 detects a potential difference that is caused when a user presses the touch panel 10. With the detected potential difference serving as a trigger, the touch panel controller 11 reads (decodes) the corresponding data, and outputs the read data as input data to an internal circuit (not shown). The transmit/receive unit 12 modulates transmission data sent from the internal circuit, and inputs the modulated transmission data to the transparent electrode 2 via the stub 5. Here, the modulated transmission data are included in a radiofrequency voltage signal. The transmit/receive unit 12 also demodulates electromagnetic wave received through an antenna, and outputs the demodulated electromagnetic wave as received data to the internal circuit.

With the above structure, a small-sized, simple input device equipped with a wireless data communication antenna that can achieve sufficiently high gain can be obtained.

Figure 5:
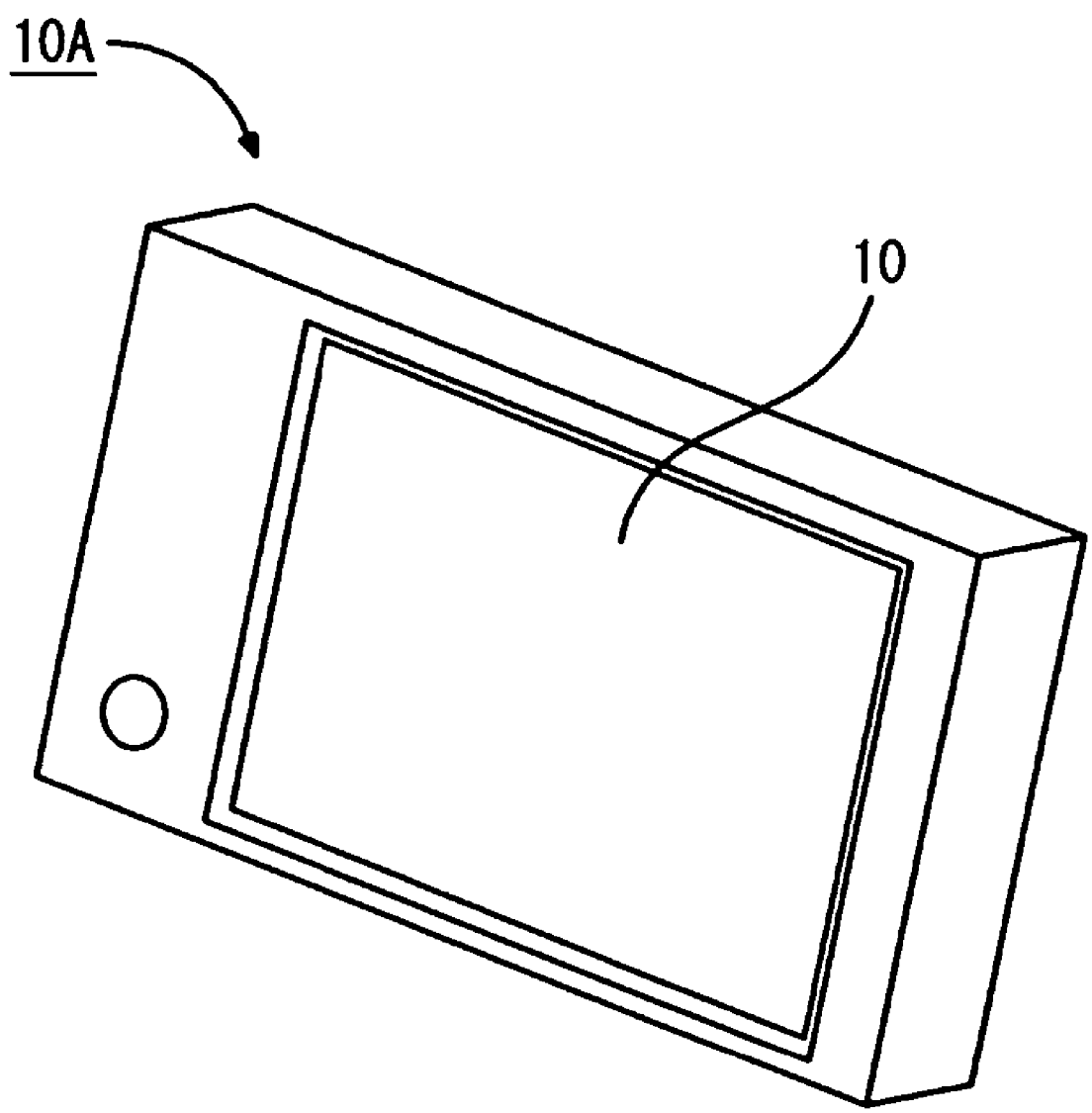
FIG. 5 is a perspective view showing the exterior of an electronic apparatus equipped with the input device shown in FIG. 4.

The above input device 10a may be mounted on an electronic apparatus 10A shown in FIG. 5, so as to obtain a small-sized electronic apparatus equipped with an antenna that can achieve sufficiently high gain without attenuation of generated electromagnetic wave. As the touch panel provided on the front face of the apparatus functions as an antenna, generated electromagnetic wave can be prevented from attenuating in the apparatus.

As described above, in accordance with this embodiment, a small-sized touch panel can be realized by using conventional electrodes as an antenna. Also, a microstrip antenna can be realized by using the conventional electrodes as an antenna, and accordingly, sufficiently high gain can be achieved. Furthermore, an antenna is incorporated into the touch panel, generated electromagnetic wave can be outputted to the outside of the device without attenuation. Further, an input device and an electronic apparatus having the above effects can be realized by employing the touch panel.

(Second Embodiment)

Figure 6A:
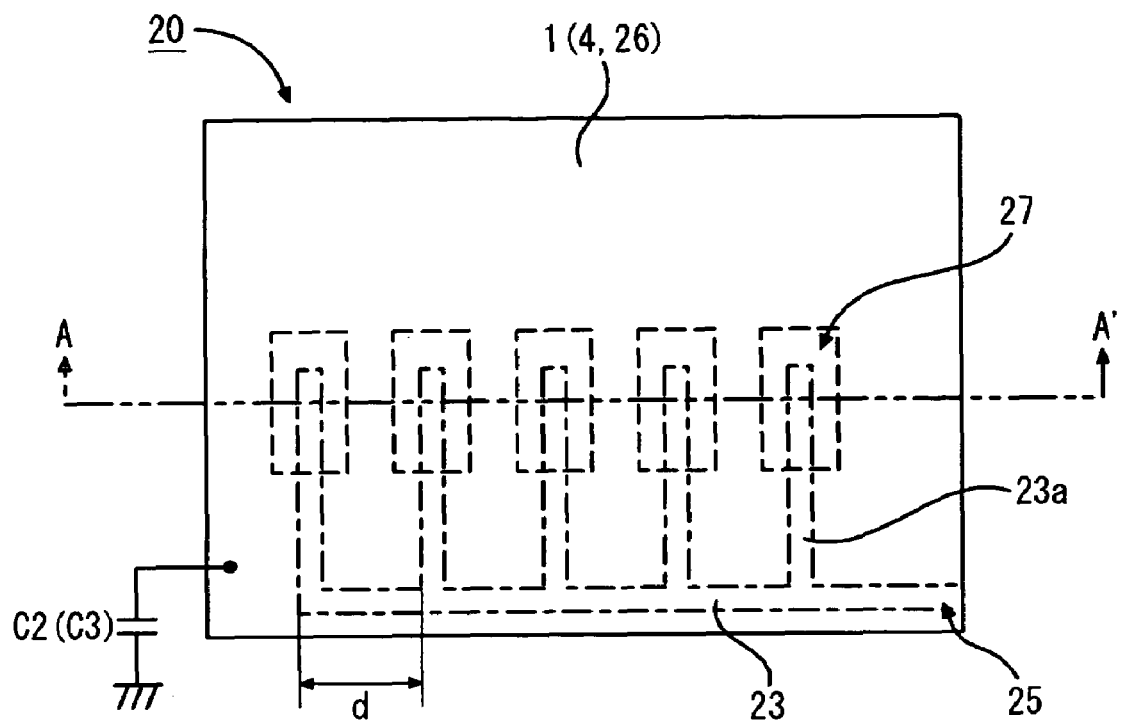
FIG. 6A is a top view of a touch panel in accordance with a second embodiment of the present invention.
Figure 6B:
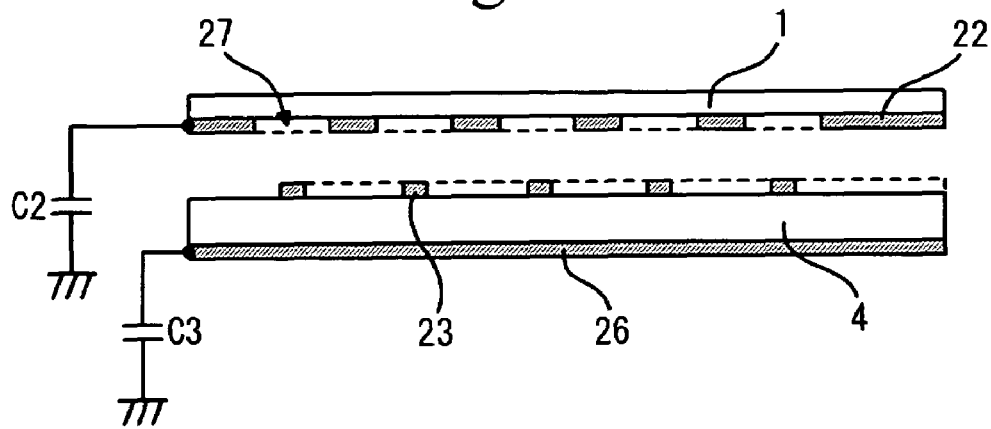
FIG. 6B is a section view of the touch panel, taken along the line A-A' of FIG. 6A.

Referring now to FIGS. 6A and 6B, a second embodiment of the present invention will be described in detail. FIGS. 6A and 6B illustrate the structure of a touch panel 20 in accordance with this embodiment. FIG. 6A is a top view of the touch panel 20, and FIG. 6B is a section view of the touch panel 20, taken along the line A-A' of FIG. 6A.

As shown in FIGS. 6A and 6B, the touch panel 20 includes two films 1 and 4 that are arranged to face each other, with a spacer (not shown) forming a predetermined gap G between the films 1 and 4. The touch panel 20 also includes transparent electrodes 22 and 23 formed on the facing surfaces of the films 1 and 4, respectively. In this embodiment, the touch panel 20 further includes a transparent electrode 26 formed on the opposite surface of the film 4 to the surface on which the transparent electrode 23 is formed.

The transparent electrode 26 covers the entire back surface of the film 4, and is grounded via a capacitor C3 so as to maintain a low potential with respect to a radiofrequency. The transparent electrode 23 formed on the opposite surface to the transparent electrode 26 forms comb-like strip lines including electrode fingers 23a that are arranged in parallel with one another. In this structure, a power supply unit 25 is provided at one end of a common wire of the electrode fingers 23a.

The transparent electrode 22 formed on the surface of the film 1 facing the transparent electrode 23 covers the film 1, and is grounded via a capacitor C2 so as to maintain a low potential with respect to a radiofrequency. In the transparent electrode 22, through apertures 27 are formed at the locations facing the top ends of the electrode fingers 23a on the film 1, so that the top ends of the electrode fingers 23a are electromagnetically exposed to the surface (on the user side) of the touch panel 20.

In this manner, microstrip antennas are formed and arranged by employing the three transparent electrodes 22, 23, and 26 in this embodiment. In this structure, a radiofrequency is inputted or outputted to the transparent electrode 23 that is in the middle among the three transparent electrodes forming the antennas. Meanwhile, the other two transparent electrodes 22 and 26 sandwiching the transparent electrode 23 are maintained at the ground potential with respect to the radiofrequency. By doing so, the corresponding antenna forms a similar structure to a coaxial cable having the electrode fingers 23a as center lines. The apertures 27 formed in the transparent electrode 22 serve as windows for releasing generated electromagnetic wave from the electrode fingers 23a.

The resonant frequency of each antenna depends on the distance d between each two neighboring electrode fingers 23a. More specifically, where the relative permittivity of the film 4 is represented by $\epsilon r$, the relationship between the distance d and the resonant frequency $\lambda$ can be expressed as:

$$\epsilon r = \lambda^2/d^2 \qquad (1)$$

Accordingly, the distance d between each two neighboring electrode fingers 23a is controlled, and the resonant frequencies of the antennas are made uniform or varied, so that the antenna bandwidth can be widened, and that the separation from the frequency bands in the vicinity can be enhanced. Where resonance is to be caused in a millimeter waveband, patterning should be performed so that the distance d becomes several millimeters long, which is the resonant wavelength.

The transparent electrodes 22 and 23 formed on the films 1 and 4, respectively, also function as resistance films that cause a potential difference for detecting an input.

If a diode-equipped panel that performs detection on one plane or a four-corner driving technique is employed for the touch panel 20 having the above structure, deterioration in the linearity of antenna characteristics can be restricted.

The transparent electrodes 22 and 23 are patterned by a technique such as etching, silkscreen printing, or laser cutting, in the same manner as in the first embodiment. The other aspects of this embodiment are also the same as those of the first embodiment, and therefore, explanation of them is omitted herein.

As described above, a small-sized touch panel can be realized by using conventional electrodes as antennas in the same manner as in the first embodiment. With the conventional electrodes serving as antennas, a microstrip antenna is realized, and sufficiently high gain can be achieved. Further, by incorporating antennas into a touch panel, generated electromagnetic wave can be released from the device without attenuation. Also, an input device or an electronic apparatus that employs such a touch panel exhibits the same effects as above.

(Third Embodiment)

Referring now to FIGS. 7A through 7D, a third embodiment of the present invention will be described in detail. FIGS. 7A through 7D illustrate the structure of a touch panel 30 in accordance with this embodiment. FIG. 7A is a top view of an upper layer 30u and a lower layer 30d included in the touch panel 30. FIG. 7B is a partial view of the back surface of the upper layer 30u. FIG. 7C is a top view of the upper layer 30u arranged over the lower layer 30d. FIG. 7D is a section view of the touch panel 30, taken along the line A-A'of FIG. 7C.

As shown in FIGS. 7A through 7D, a strip-line transparent electrode 32 having electrode fingers 32a arranged in parallel with one another is patterned on the upper layer 30u of the touch panel 30. In this structure, a power supply unit 32b is provided at one end of the common wire of the electrode fingers 32a. A radiofrequency is inputted to or outputted from the transparent electrode 32 through the power supply unit 32b. On the common wire connecting each two neighboring electrode fingers 32a to each other, a delay element 32c is provided between each two neighboring electrode fingers 32a, so that the radiofrequency phases of the electrode fingers 32a can be varied in a stepwise fashion.

As shown in FIG. 7B, a coordinate detecting resistance film 36 having slots 37 each patterned into a predetermined shape is formed on the back surface of the upper layer 30u, which is the surface facing the lower layer 30d with a gap G therebetween. The slots 37 are openings formed through the coordinate detecting resistance film 36, and serves to secure a large enough space to form an electromagnetic field when the transparent electrode 32 and coordinate detecting resistance films 33 formed on the lower layer 30d function as an antenna.

Each of the coordinate detecting resistance films 33 has a predetermined shape (a T shape, for example) on the upper surface of the lower layer 30d, which is the surface facing the upper layer 30u. The coordinate detecting resistance films 33, together with the transparent electrode 32, not only function as the strip lines of antenna elements, but also obtain electric connection when engaged with the slots 37 when a user presses the upper layer 30u. More specifically, when a user presses the upper layer 30u, the coordinate detecting resistance films 33 are engaged with the slots 37, so that the power supply unit 32b is electrically connected to a connection point 33b. Accordingly, a potential difference between the power supply unit 32b and the connection point 33b can be detected, and input coordinates can also be detected. The coordinate detecting resistance films 33 are also connected to a wire 33a. The wire 33a is grounded via a capacitor C4 connected to the connection point 33b. Accordingly, each of the coordinate detecting resistance films 33 is grounded via the capacitor C4, so as to maintain low voltage with respect to the radiofrequency.

The patterning of the transparent electrode 32 and the coordinate detecting resistance films 33 and 36 is performed by a technique such as etching, laser cutting, or silkscreen printing, in the same manner as in the first embodiment.

As described above, microstrip antennas formed with the strip-line transparent electrode 32 formed on the film 1 and the coordinate detecting resistance films 33 formed on the film 4 are arranged in an array, so as to obtain higher gain. Here, the distance between each two neighboring antennas may be controlled in the same manner as in the second embodiment. By doing so, the antenna bandwidth can be widened, and the separation from the frequency bands in the vicinity can be enhanced. Further, the delay elements 32c for shifting phases are inserted between the antennas (between the electrode fingers 32a). With these delay elements 32c, the directivity can be varied, and the touch panel 30 can be employed in a radar device or the like. Using this structure, a phased array antenna can be formed. Further, with additions such as an attenuator and an amplifier, an adaptive array antenna can also be formed.

The resonant frequencies of the antennas arranged as above are varied so as to obtain resonance in a broader band. In this manner, an antenna that is suitable for ultra broadband wireless communication can be realized. The other aspects of this embodiment are the same as those of the first embodiment, and therefore, explanation of them is omitted herein.

(Fourth Embodiment)

Figure 8A:
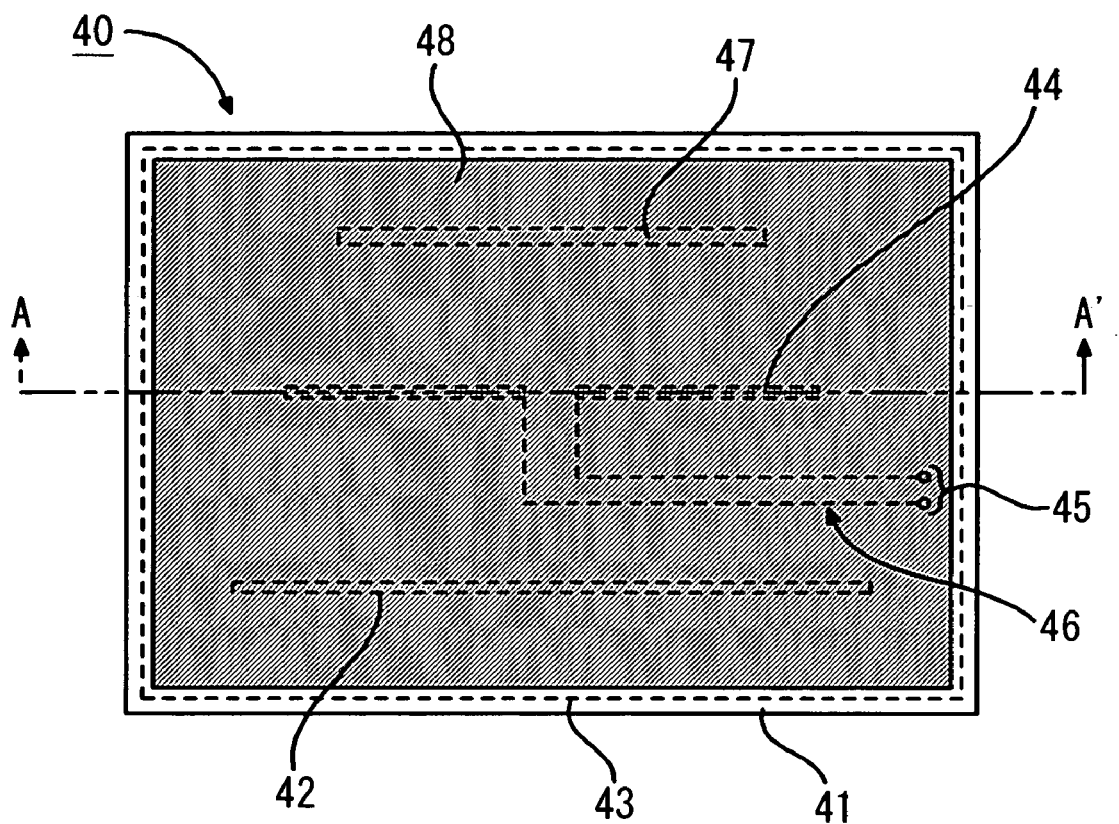
FIG. 8A is a top view of a touch panel in accordance with a fourth embodiment of the present invention.
Figure 8B:
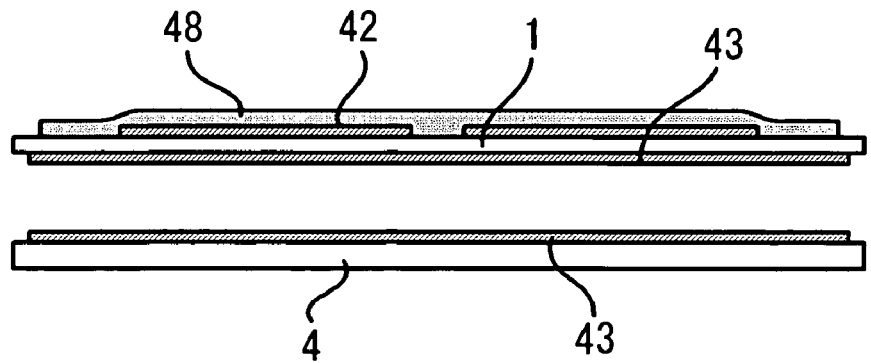
FIG. 8B is a section view of the touch panel, taken along the line A-A' of FIG. 8A.

Referring now to FIGS. 8A and 8B, a fourth embodiment of the present invention will be described in detail. FIGS. 8A and 8B illustrate the structure of a touch panel 40 in accordance with this embodiment. FIG. 8A is a top view of the touch panel 40, and FIG. 8B is a section view of the touch panel 40, taken along the line A-A'of FIG. 8A.

As shown in FIGS. 8A and 8B, the touch panel 40 has a Yagi-Uda antenna formed thereon. In the touch panel 40 including two films 1 and 4, transparent electrodes 42, 44 and 47 are formed in parallel with one another on the film 1. The transparent electrode 44 located in the middle is connected to a power supply terminal 45 via a wire 46. A transmitted or received radiofrequency is inputted or outputted through the power supply terminal 45.

A coordinate detecting resistance film 43 is formed on the back surface of the film 1, which is the surface on the opposite side to the surface provided with the Yagi-Uda antenna. This coordinate detecting resistance film 43 covers the entire back surface of the film 1. Likewise, a coordinate detecting resistance film 49 is formed on a surface of the film 4 that faces the coordinate detecting resistance film 43. When the two films 1 and 4 having a spacer (not shown) interposed for allowing a predetermined gap G in between are pressed, the coordinate detecting resistance films 43 and 49 formed on the films 1 and 4 are brought into contact with each other. A potential difference according to the contact point is then obtained, and the pressed point can be detected accordingly.

As described above, a Yagi-Uda antenna is formed on a conventional touch panel in this embodiment, so as to obtain a small-sized touch panel equipped with high gain antennas. By incorporating antennas into a touch panel, generated electromagnetic wave can be released from the device without attenuation. Further, such a touch panel may be employed in an input device or an electronic apparatus, so that the input device or the electronic apparatus exhibits the same effects as above. The other aspects of this embodiment are the same as those of the first embodiment, and therefore, explanation of them is omitted herein.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A touch panel comprising:
   a first layer and a second layer that are arranged to face each other, with a predetermined gap being formed between the first layer and the second layer;
   a first resistance film that is formed on a surface of the first layer;

a second resistance film that is formed on a surface of the second layer; and a power supply unit that is provided on the first resistance film, wherein the first resistance film and the second resistance film, used for sensing a touch, form an antenna.

2. The touch panel as claimed in claim 1, wherein the surface of the first layer faces the second layer, and the surface of the second layer faces the first layer.

3. The touch panel as claimed in claim 1, wherein the first and second resistance films.

4. The touch panel as claimed in claim 1, wherein the surface of the first layer is on the opposite side to another surface of the first layer that faces the second layer; and the surface of the second layer faces the first layer.

5. The touch panel as claimed in claim 1, wherein the second resistance film is grounded via a capacitor.

6. The touch panel as claimed in claim 1, wherein the power supply unit is a stub that is integrally formed with the first resistance film by patterning.

7. The touch panel as claimed in claim 1, wherein at least one of the first resistance film and the second resistance film is a transparent electrode film.

8. The touch panel as claimed in claim 1, wherein at least one of the first resistance film and the second resistance film is patterned so as to resonate at a predetermined frequency.

9. The touch panel as claimed in claim 1, wherein at least one of the first resistance film and the second resistance film is a printed resistance film including a carbon or organic conductive film that is patterned by screen printing.

10. The touch panel as claimed in claim 1, further comprising a third resistance film that is formed on another surface of the first layer, the surface being on the opposite side to the surface on which the first resistance film is formed, wherein the second resistance film and the third resistance film have an identical potential with low impedance with respect to a radiofrequency.

11. The touch panel as claimed in claim 1, wherein the first resistance film and the second resistance film form a plurality of antennas that resonate at a predetermined frequency.

12. The touch panel as claimed in claim 1, wherein the first resistance film and the second resistance film form a plurality of antennas that resonate at predetermined different frequencies.

13. The touch panel as claimed in claim 11, wherein the plurality of antennas are arranged in a predetermined manner to form one of a phased array antenna and an adaptive array antenna.

14. The touch panel as claimed in claim 11, wherein the portions that form the plurality of antennas in the first resistance film and the second resistance film have a microstrip line structure.

15. The touch panel as claimed in claim 11, wherein the plurality of antennas form strip lines that are arranged at intervals of a resonant wavelength.

16. The touch panel as claimed in claim 11, further comprising a third resistance film that is formed on another surface of the first layer, the surface being on the opposite side to the surface on which the first resistance film is formed, wherein:

the plurality of antennas form strip lines that are arranged at intervals of a resonant wavelength; and the third resistance film has apertures formed in the regions corresponding to the antennas.

17. A touch panel comprising:

a first layer and a second layer that are arranged to face each other, with a predetermined gap being formed between the first layer and the second layer; and a first resistance film and a second resistance film that are formed on two parallel surfaces of the first layer and the second layer, and are patterned so as to resonate at a predetermined frequency, the first resistance film and a second resistance film sensing a touch on the touch panel and comprising an antenna.

18. A touch panel comprising:

a first resistance layer and a second resistance layer facing each other with a predetermined gap therebetween; and a Yagi-Uda antenna comprising transparent electrodes formed on a film having a first surface on which the first resistance layer is provided and having a second surface on which the second resistance layer is provided.

19. An input device comprising:

a touch panel;

a touch panel controller that controls the touch panel; and a transmit/receive unit that transmits and receives data through an antenna, the touch panel including:

a first layer and a second layer that are arranged to face each other, with a predetermined gap being formed between the first layer and the second layer;

a first resistance film that is formed on a surface of the first layer;

a second resistance film that is formed on a surface of the second layer; and a power supply unit that is provided on the first resistance film, wherein:

the first resistance film and the second resistance film, used to sense a touch, form the antenna.

20. An input device comprising:

a touch panel;

a touch panel controller that controls the touch panel; and a transmit/receive unit that transmits and receives data through an antenna, the touch panel including:

a first layer and a second layer that are arranged to face each other, with a predetermined gap being formed between the first layer and the second layer;

a first resistance film that is formed on a surface of the first layer;

a second resistance film that is formed on a surface of the second layer; and a power supply unit that is provided on the first resistance film, the first resistance film and the second resistance film forming a plurality of antennas that resonate at predetermined different frequencies, and the transmit/receive unit performing ultra broadband wireless communication through the plurality of antennas.

21. An electronic apparatus comprising an input device that includes:

a touch panel;

a touch panel controller that controls the touch panel; and a transmit/receive unit that transmits and receives data through an antenna, the touch panel including:

a first layer and a second layer that are arranged to face each other, with a predetermined gap being formed between the first layer and the second layer;

a first resistance film that is formed on a surface of the first layer;

a second resistance film that is formed on a surface of the second layer; and a power supply unit that is provided on the first resistance film, the first resistance film and the second resistance film, used to sense a touch, form the antenna.

* * * * *